(12) United States Patent
Eastoe et al.

(10) Patent No.: US 10,578,467 B2
(45) Date of Patent: Mar. 3, 2020

(54) SUBSEA FLOW METER ASSEMBLY

(71) Applicant: Siemens Aktiengesellschaft, Munich (DE)

(72) Inventors: Andrew Robert Eastoe, Urangsvaeg (NO); Kjetil Haldorsen, Rubbestadneset (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 124 days.

(21) Appl. No.: 15/567,405

(22) PCT Filed: Apr. 15, 2016

(86) PCT No.: PCT/EP2016/058313
§ 371 (c)(1),
(2) Date: Oct. 18, 2017

(87) PCT Pub. No.: WO2016/173864
PCT Pub. Date: Nov. 3, 2016

(65) Prior Publication Data
US 2018/0106648 A1  Apr. 19, 2018

(30) Foreign Application Priority Data
Apr. 27, 2015 (EP) .................... 15165224

(51) Int. Cl.
*G01F 1/44* (2006.01)
*G01F 1/38* (2006.01)
(Continued)

(52) U.S. Cl.
CPC .............. *G01F 1/383* (2013.01); *G01F 1/363* (2013.01); *G01F 1/44* (2013.01); *G01F 1/50* (2013.01); *G01F 15/10* (2013.01); *G01F 15/14* (2013.01)

(58) Field of Classification Search
CPC . G01F 15/10; G01F 15/14; G01F 1/50; G01F 1/44
See application file for complete search history.

(56) References Cited

U.S. PATENT DOCUMENTS 4,926,698 A    5/1990   Owen
5,469,749 A    11/1995  Shimada et al.
(Continued)

FOREIGN PATENT DOCUMENTS

CN    201241692 Y    5/2009
CN    102735292 A    10/2012
(Continued)

OTHER PUBLICATIONS

Extended European Search Report dated Oct. 23, 2015.
International Search Report and Written Opinion dated Jul. 15, 2016.

*Primary Examiner* — Jamel E Williams
(74) *Attorney, Agent, or Firm* — Harness, Dickey & Pierce, P.L.C.

(57) ABSTRACT

A subsea flow meter assembly includes a pipe section extending in an axial direction and providing a flow path for a medium. At least four measuring ports are provided at different locations in the pipe section. A first assembly measures at least a differential pressure between a first and second ports and an absolute pressure at one of the ports. A second assembly measures a differential pressure between a third and a fourth ports, and an absolute pressure at one of the ports. A first measuring unit is used to take measurements of the differential pressure and the absolute pressure via the first sensor assembly. A second measuring unit is used to take measurements of the differential pressure and the absolute pressure via the second sensor assembly. An (Continued)

evaluation unit of each determines a flow rate of a flow of medium through the pipe section based on the measurements.

21 Claims, 4 Drawing Sheets

(51) Int. Cl.
*G01F 1/50* (2006.01)
*G01F 15/10* (2006.01)
*G01F 15/14* (2006.01)
*G01F 1/36* (2006.01)

(56) References Cited

U.S. PATENT DOCUMENTS

| | | | |
|---|---|---|---|
| 7,299,707 B1 | 11/2007 | Evans | |
| 2013/0319074 A1* | 12/2013 | Sittler | G01F 25/0007 73/1.35 |
| 2013/0340519 A1* | 12/2013 | Kurth | G01F 7/00 73/196 |

FOREIGN PATENT DOCUMENTS

| | | |
|---|---|---|
| EP | 1944583 A1 | 7/2008 |
| WO | WO 0014484 A2 | 3/2000 |
| WO | WO 2015003856 A1 | 1/2015 |

\* cited by examiner

SUBSEA FLOW METER ASSEMBLY

PRIORITY STATEMENT

This application is the national phase under 35 U.S.C. § 371 of PCT International Application No. PCT/EP2016/058313 which has an International filing date of Apr. 15, 2016, which designated the United States of America and which claims priority to European patent application number EP15165224.5 filed Apr. 27, 2015, the entire contents of which are hereby incorporated herein by reference.

FIELD

An embodiment of the present invention generally relates to a subsea flow meter assembly for measuring the flow of a medium through a pipe section. Furthermore, an embodiment of the present invention generally relates to a method of providing a subsea flow meter assembly.

BACKGROUND

Flow meters find application in several technical fields. The measurement of flow is particularly important in the oil and gas production, for example for determining the quantity of hydrocarbons extracted from a reservoir. Also, when injecting a medium into a well, such as during enhanced oil recovery, the measurement of flow is of importance. A particular challenge is the measurement of flow in a subsea environment, in which pressures in excess of hundred bars can prevail.

A subsea production system can for example comprise a single well or plural satellite wells, which can be connected to each other via flow lines. Furthermore, such flow lines are generally provided for transporting produced hydrocarbons to a floating vessel, such as a floating production storage and offloading vessel (FPSO), to an offshore platform, or, via a pipeline, to an onshore side. To ensure a reliable operation of such subsea production system, flow measurements are required at several locations, for example at the well heads, at joints of the pipes and the like. It is particularly desirable to provide flow measurements with high precision and high reliability.

Often, flow meters suffer from the drawback that the measurements cannot be provided with the same precision over the whole range of measurable flow rates. Generally, deviations from low flow rates to high flow rates within a certain percentage are accepted. Furthermore, flow meters in the subsea environment make generally use of sensors that are arranged at different locations in the respective production system. A topside control unit or control panel receives sensor readings, such as pressure and temperature, from different sensors and thus from different sources. The topside control panel then calculates the flow rate from the different measurement values received from the different sources.

SUMMARY

The inventors have discovered that it is desirable to improve the accuracy of such flow meters. Furthermore, the inventors have discovered that it is desirable to obtain reliable flow rate measurements and to have a high degree of availability of the flow meter. Furthermore, the inventors have discovered that it is desirable to provide a compact and cost efficient flow meter.

Accordingly, the inventors have discovered that there is a need for an improved flow meter that obviates at least some of the draw backs mentioned above.

The claims describe embodiments of the invention.

According to an embodiment of the invention, a subsea flow meter assembly for measuring the flow of a medium is provided. The subsea flow meter assembly comprises a pipe section extending in an axial direction and providing a flow path for the medium. At least four measuring ports are provided at different locations in the pipe section. A first and a second measuring port are spaced apart in the axial direction of the pipe section, and a third and a fourth measuring port are also spaced apart in an axial direction of the pipe section.

According to an embodiment of the invention, the subsea flow meter assembly further comprises a first sensor assembly configured to measure at least a differential pressure between the first and second measuring ports, and is further configured to measure an absolute pressure at the first, the second or at both measuring ports. A second sensor assembly is provided and is configured to measure at least a differential pressure between the third and fourth measuring ports and an absolute pressure at the third, the fourth or both measuring ports.

According to an embodiment of the invention, the subsea flow meter assembly further includes a first measuring unit mounted to the pipe section and a second measuring unit mounted to the pipe section. The first measuring unit is configured to take measurements of the differential pressure and the absolute pressure via the first sensor assembly, and the second measuring unit is configured to take measurements of the differential pressure and the absolute pressure via the second sensor assembly. The first measuring unit and the second measuring unit further each comprise an evaluation unit and an output interface. The evaluation unit is configured to determine a flow rate of a flow of medium through the pipe section based on the pressure measurements, and to give out a signal at the output interface that is representative of the determined flow rate.

In at least one embodiment, the method further comprises connecting a first sensor assembly to the first and second measuring ports for measuring at least a differential pressure between the first and second measuring ports and an absolute pressure at at least one of the first and second measuring ports; connecting a second sensor assembly to the third and fourth measuring ports for measuring at least a differential pressure between the third and fourth measuring ports and an absolute pressure at at least one of the third and fourth measuring ports; mounting a first measuring unit to the pipe section, wherein the first measuring unit is configured to take measurements of the differential pressure and the absolute pressure via the first sensor assembly; and mounting a second measuring unit to the pipe section, wherein the second measuring unit is configured to take measurements of the differential pressure and the absolute pressure via the second sensor assembly. The first measuring unit and the second measuring unit further each comprise and evaluation unit and an output interface. The evaluation unit is configured to determine a flow rate of a flow of medium through the pipe section based on the pressure measurements and to give out a signal at the output interface that is representative of the determined flow rate.

By way of such method, a subsea flow meter assembly may be obtained that has advantages similar to the ones outlined further above.

BRIEF DESCRIPTION OF THE DRAWINGS

The foregoing and other features and advantages of the invention will become further apparent from the following

DETAILED DESCRIPTION

According to an embodiment of the invention, a subsea flow meter assembly for measuring the flow of a medium is provided. The subsea flow meter assembly comprises a pipe section extending in an axial direction and providing a flow path for the medium. At least four measuring ports are provided at different locations in the pipe section. A first and a second measuring port are spaced apart in the axial direction of the pipe section, and a third and a fourth measuring port are also spaced apart in an axial direction of the pipe section.

According to an embodiment of the invention, the subsea flow meter assembly further comprises a first sensor assembly configured to measure at least a differential pressure between the first and second measuring ports, and is further configured to measure an absolute pressure at the first, the second or at both measuring ports. A second sensor assembly is provided and is configured to measure at least a differential pressure between the third and fourth measuring ports and an absolute pressure at the third, the fourth or both measuring ports.

According to an embodiment of the invention, the subsea flow meter assembly further includes a first measuring unit mounted to the pipe section and a second measuring unit mounted to the pipe section. The first measuring unit is configured to take measurements of the differential pressure and the absolute pressure via the first sensor assembly, and the second measuring unit is configured to take measurements of the differential pressure and the absolute pressure via the second sensor assembly. The first measuring unit and the second measuring unit further each comprise an evaluation unit and an output interface. The evaluation unit is configured to determine a flow rate of a flow of medium through the pipe section based on the pressure measurements, and to give out a signal at the output interface that is representative of the determined flow rate.

Via such flow meter assembly, reliable flow measurements can be achieved. The differential pressure measurements and the absolute pressure measurements, also termed line pressure measurements, are taken at substantially the same location of the system of which the pipe section may form part. Since the measuring units including the evaluation units are mounted on the same pipe section, connections between these measuring units and the ports in the pipe section can be kept short and only few connections are needed.

Furthermore, it allows the system do be made very compact. The system may achieve an increased reliability by reducing the amount of required connections (which are usually weak points) and the respective sealing, while at the same time providing redundancy. The subsea flow meter assembly may be capable of giving out two independently measured and determined flow rates of the flow of medium through the pipe section. Accordingly, even if there is a failure in one of the sensor assemblies or in a measuring unit, the subsea flow meter assembly can still deliver flow measurements. Also, since the signal that is given out is representative of the determined flow rate, there is no need for additional processing, such as at a top side installation. The determined flow rate may be used directly by another subsea module or the like. Since the four measuring ports are located in the same pipe section and thus in relatively close proximity of each other, the accuracy of the flow rate determination may be improved.

According to an embodiment, the flow meter assembly further comprises at least one temperature probe connected to the first and/or second measuring unit for measuring at least one of the temperature of the medium in the pipe section or the temperature of an ambient medium in which the flow meter assembly is disposed, for example the temperature of surrounding seawater when the flow meter assembly is installed subsea. In some configurations, the temperature of the medium flowing in the pipe section might be known or constant, for example if the medium has the same temperature as the surrounding ambient medium, temperature measurements might not be necessary, yet they might improve the accuracy of the flow rate determination, in particular if the medium has a different temperature or varying temperature.

The temperature probe may be arranged in one of the measuring ports, or it may be arranged in an additional measuring port.

Two temperature probes may be provided, one connected to the first measuring unit and one connected to the second measuring unit. In other embodiments, the temperature probe may be provided directly at the measuring unit, or at another position, for example to measure the temperature of the ambient medium. Each measuring unit may comprise a temperature measuring unit for determining the temperature based on a signal provided via the respective temperature probe. The temperature measuring unit may for example be configured to measure a voltage at the output of the temperature probe, and to derive from the voltage a temperature value.

In an embodiment, each of the at least four measuring ports is closed by a pressure transfer unit or a sensor of the respective first or second sensor assembly. The pressure transfer unit or the sensor is configured to seal the respective measuring port so that medium flowing in the pipe section is prevented from leaving the pipe section through the measuring port. Such pressure transfer unit may for example comprise a diaphragm seal, or remote seal, that provides separation from the medium, such as process fluid, flowing in the pipe section. The sensor may for example be a pressure transmitter. By such configuration, it may be ensured, that the medium is confined to within the pipe section and it may be avoided that the medium leaks out of pipe section or gets into contact with sensor elements.

In an embodiment, in each of the four measuring ports, a pressure transfer unit of the respective sensor assembly is arranged. Each pressure transfer unit comprises a separation diaphragm that separates the medium flowing inside the pipe section from a pressure transmission medium, and further comprises a transmission conduit, such as hydraulic piping, connected to the respective measuring unit for transmitting the pressure (that is applied by the separation diaphragm to the transmission medium) from the measuring port to the measuring unit via the pressure transmission medium. Such configuration is particularly beneficial if the medium flowing the pipe section has corrosive properties, has an elevated temperature or has a consistency that might for example clog flow lines or contaminate sensor elements. By such separation diaphragm, the medium, in particular process fluid, can be effectively separated from the transmission medium, such as oil, in particular silicon oil or the like. Sensing elements of the respective sensor assembly then only come into contact with the transmission fluid. The transmission diaphragm is configured to transmit the pressure prevailing in the medium to the pressure transmission medium. The separation diaphragm may be made of metal, in particular of stainless steel.

In an embodiment, the first and the second sensor assemblies each comprise to absolute pressure sensors and a differential pressure sensor arranged in the first or second measuring unit, respectively. The absolute pressure sensors may be configured to measure the so called "line pressure", which is an absolute pressure measured against a fixed reference, such as vacuum or atmospheric pressure. The differential pressure sensor preferably comprises a differential pressure sensing element to which the pressure that is present at each of the two respective measuring ports is provided, for example via the above mentioned pressure transfer unit. An accurate measurement of the pressure difference between the two respective measuring ports may thus be achieved. The two absolute pressure sensors are connected to measure the absolute pressure at the respective two measuring ports, i.e. each absolute pressure sensor may be connected to one measuring port via the above mentioned transmission conduit and pressure transfer unit. By such arrangement, it becomes possible to measure differential pressures that exceed the working range of the differential pressure sensor by making use of absolute pressure measurements taken by the two absolute pressure sensors, since such sensors can be provided with a significantly higher working range, ranging for example up to 500 bar or even 1000 bar.

In particular, each of the first and second sensor assemblies may comprise a pressure sensor as disclosed in the document WO 2015/003856 A1, the contents of which is incorporated herein by reference in its entirety.

In an embodiment, each measuring unit includes a subsea enclosure that is pressure resistant, wherein each subsea enclosure has a chamber having a predetermined internal pressure, preferably a pressure below 5 bar. The respective evaluation unit may comprise electronic circuits disposed inside the chamber. By providing the measuring unit with such chamber, conventional electronic circuits, for example including a microprocessor and the like, may be employed for determining the flow rate. The chamber may have an internal pressure of for example 1.5 bar or below, it may have a close to atmospheric internal pressure. The chamber may be filled with a gas, in particular with air or with nitrogen.

The subsea enclosure may have a cylindrical shape, and each measuring unit may be mounted such that the cylindrical shape extends in the axial direction. In particular, the axial direction of each subsea enclosure may be substantially parallel to the axial direction of the pipe section. A compact configuration may thus be achieved.

Furthermore, the diameter of the subsea enclosure may be smaller than the outer diameter of the pipe section. It may thus be prevented that components of the flow meter assembly protrude significantly from the pipe section, so that a compact flow meter assembly is achieved that can be also installed at locations where a little space is available.

By providing the transmission conduits between the pressure transfer unit and the respective measuring unit, each measuring unit only needs to be provided with two hydraulic connections. Furthermore, it comprises only one electrical connection for providing the signal representative of the flow rate and for receiving electric power. Accordingly, the subsea flow meter assembly requires significantly less cabling than conventional flow meters, and furthermore reduces the number of electrical connectors required, which may increase the reliability significantly, and which may further reduce complexity.

In an embodiment, the subsea flow meter assembly further comprises an electrical power connection and data connection from each measuring unit to a control unit. The electrical power connection and the data connection may be provided by a single cable having electrical conductors, and may further have an optical fiber or electrical conductors for data transmission, and separate transmission lines may be provided for the electrical power connection and the data connection. The control unit may be configured to receive and to further process the signal representative of the determined flow rate, and the control unit may be installed subsea or topside, for example on an offshore platform or at an onshore site.

The data connection may comprise a bus connection, for example a CAN (controller area network) connection, a profibus connection, or may comprise an Ethernet connection or the like. In some embodiments, the electrical power connection and the data connection may be provided by the same electrical conductors using for example power line communication.

In an embodiment, the subsea flow meter assembly further comprises a protective shield that is mounted such that each measuring unit is located between the pipe section and the protective shield. In other words, each measuring unit is protected by the protective shield. The shield may have two parts, yet in other configurations, it may be made of only a single part or may comprise more, for example four parts. The protective shield is preferably configured and arranged to furthermore protect connections from the measuring ports to the respective measuring unit, in particular to protect an electrical connection to a pressure transducer arranged in the measuring port or to protect a transmission conduit from a pressure transfer unit to the measuring unit. The pipe section may comprise respective mounts to which the protective shield is mounted. The protective shield may extend circumferentially around the pipe section to cover at least 50% of the pipe section in circumferential direction. The protective shield may extend in axial direction so as to cover at least the measuring unit.

Accordingly, when installing the subsea flow meter assembly, damage to components thereof may be prevented. Furthermore, when installed subsea, the protective shield can protect components of the subsea flow meter assembly from objects such as an ROV, another component of the subsea device or other items which may accidentally come into contact with the subsea flow meter assembly.

In an embodiment, the first and the third measuring ports are located at the same axial position, and the second and the fourth measuring ports are located at the same axial position of the pipe section. Accordingly, both absolute and differential pressure measurements may be taken by the first and second measuring units at substantially the same axial positions. The measurements taken and thus the determined flow rate are thus comparable and may be used to determine a malfunction of one of the flow rate measurements. Furthermore, in case one of the measuring units fails, the other measuring unit may take over and may deliver comparable values. It may thus be ensured that the flow rate is measured reliably at the predetermined position on the pipe section.

The first and second measuring ports may be located at the same first circumferential position, and the third and fourth measuring ports may be located at the same second circumferential position. The first and the second circumferential positions and the first and second measuring units may be distributed around the circumference of the pipe section. By such arrangement in which the components are distributed around the pipe section, a compact and easy to handle subsea flow meter assembly can be achieved.

The first and second measuring units may be mounted to the pipe section by respective first and second mounts.

The angle between the first and the second circumferential positions may be between about 60 and about 120 degrees, preferably between about 80 and about 100 degrees, for example about 90 degrees. In other embodiments, the first and second circumferential positions may be located on opposite sides of the pipe section, they may thus have an angle between them of about 180 degrees.

Each measuring port may be surrounded by an attachment flange, and the two attachment flanges of the respective two axially spaced apart measuring ports have a separation of D between their most distant points. The axial extension of the measuring unit may be substantially similar to D or may be smaller than D. A subsea flow meter assembly may thus be achieved which has a compact size also in the axial direction.

In an embodiment, each port may be surrounded by an attachment flange for attachment of a pressure transfer unit or a sensor of the respective sensor assembly. Each attachment flange may have a predefined thickness in the mounting direction of the attachment flange, and the pressure transfer unit or sensor may protrude a distance less than the predefined thickness from the attachment flange when it is mounted in the measuring port. Preferably, it protrudes less than 50% or even less than 25% of the predefined thickness. Accordingly, such configuration prevents that part of the sensor or the pressure transfer unit protrudes significantly from the respective port and flange, thus reducing the risk of damage to these components and furthermore leading to a compact design of the subsea flow meter assembly. In some configurations, the pressure transfer unit or the sensor may even be substantially flush with the bolts that are used to mount the attachment flange to the pipe section. The thickness of the attachment flange may include these bolts. Mounting direction may refer to the direction in which the bolts are inserted into the attachment flange.

In an embodiment, the pipe section has a section of increased diameter having a substantially rectangular cross section and having respective four sides. A first side comprises the first measuring unit, a second side comprises the second measuring unit, a third side comprises the first and second measuring ports, and a fourth side comprises the third and fourth measuring ports. By way of such configuration, a robust but compact flow meter assembly may be achieved.

In an embodiment, the flow meter is a Venturi flow meter. The pipe section may have a constriction, e.g. a section of reduced inner diameter or an object arranged in the flow, wherein the first and third measuring ports are located upstream of the constriction and wherein the second and fourth measuring ports are located at the constriction or downstream of the constriction.

According to an embodiment, the subsea flow meter assembly is configured to be operable at a water depth of at least 2000 meters, preferably at least 3000 meters.

A further embodiment according to the invention relates to a method of providing a subsea flow meter assembly for measuring the flow of a medium. The method comprises the steps of providing a pipe section extending in an axial direction, the pipe section providing a flow path for a medium; providing at least four measuring ports at different locations on the pipe section, wherein the first and second measuring ports are spaced apart in axial direction of the pipe section, and wherein the third and fourth measuring ports are spaced apart in axial direction of the pipe section.

In at least one embodiment, the method further comprises connecting a first sensor assembly to the first and second measuring ports for measuring at least a differential pressure between the first and second measuring ports and an absolute pressure at at least one of the first and second measuring ports; connecting a second sensor assembly to the third and fourth measuring ports for measuring at least a differential pressure between the third and fourth measuring ports and an absolute pressure at at least one of the third and fourth measuring ports; mounting a first measuring unit to the pipe section, wherein the first measuring unit is configured to take measurements of the differential pressure and the absolute pressure via the first sensor assembly; and mounting a second measuring unit to the pipe section, wherein the second measuring unit is configured to take measurements of the differential pressure and the absolute pressure via the second sensor assembly. The first measuring unit and the second measuring unit further each comprise and evaluation unit and an output interface. The evaluation unit is configured to determine a flow rate of a flow of medium through the pipe section based on the pressure measurements and to give out a signal at the output interface that is representative of the determined flow rate.

By way of such method, a subsea flow meter assembly may be obtained that has advantages similar to the ones outlined further above.

In embodiments of the method, the method may be performed so as to obtain a subsea flow meter assembly in any of the above outlined configurations. In particular, method steps described further above with respect to the subsea flow meter assembly may form part of the method.

It is to be understood that the features mentioned above and those yet to be explained below can be used not only in the respective combinations indicated, but also in other combinations or in isolation without leaving the scope of the present invention.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

Figure 1:
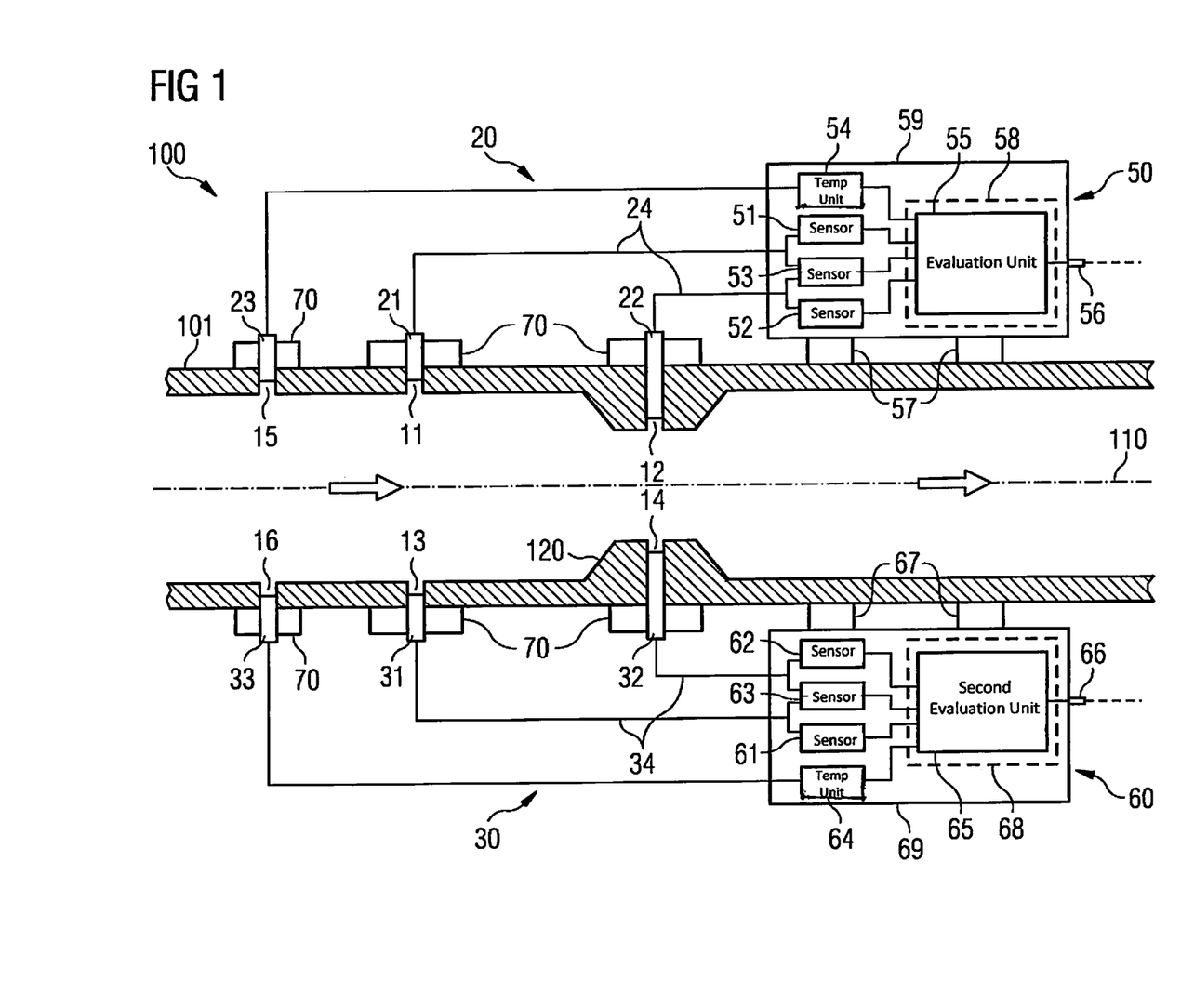
FIG. 1 is a schematic drawing showing a sectional view of a subsea flow meter assembly according to an embodiment of the invention.

FIG. 1 illustrates a subsea flow meter assembly 100 having a pipe section 101 that extends along an axial direction 110. The pipe section 101 may be mounted as a part of a flow line for the transport of a medium, in particular process fluid, such as hydrocarbons produced from a well, in particular a subsea well, or for the transport of other fluids, including liquids, for example for the injection of water into a well. The medium is preferably a liquid, but it may be a mixture containing solid and/or gaseous constituents. The subsea flow meter assembly 100 of is configured as a single phase flow meter that measures the flow of a medium, in particular liquid, through the pipe section 101.

The pipe section 101 has four measuring ports 11, 12, 13 and 14. The first and second measuring ports 11, 12 are spaced apart in the axial direction, and the third and fourth measuring ports 13, 14 are also spaced apart in the axial direction by the same distance, as can be seen in FIG. 1. The subsea flow meter assembly 100 is configured as a Venturi flow meter in which the flow rate is determined based on pressure measurements taken upstream of a constriction 120 that is provided in the pipe section 101 and at or downstream of the constriction 120. The flow of medium through the pipe section 101 is indicated by arrows. As can be seen, the first and third measuring ports 11, 13 are arranged upstream of the constriction 120, while the second and fourth measuring ports 12, 14 are arranged at the restriction 120. When the velocity of the flow is increased due to the restriction 120, the pressure drops, and the flow rate can be determined on the basis of pressure measurements taken at their respective measuring ports 11, 12 or 13, 14.

The subsea flow meter assembly 100 further comprises a first sensor assembly 20 and a first measuring unit 50 having a (first) subsea enclosure 59. The first sensor assembly 20 comprises a first pressure transfer unit 21 arranged in the first measuring port 11 and a second pressure transfer unit arranged in the second measuring port 12. The pressure transfer units 21, 22 comprise a diaphragm seal which includes a metal diaphragm that separates the process fluid flowing in the pipe section 101 from a transmission medium. The process fluid applies pressure to the respective diaphragm which transmits the pressure into the transmission medium. Transmission conduits 24 are filled with the transmission medium and transmit the applied pressure to the measuring unit 50. The process fluid does accordingly not get into contact with sensor elements within the measuring unit 50 and stays confined to within the pipe section 101. This is particularly beneficial if the process fluid is a slurry or comprises corrosive substances or the like. A remote seal is thus provided.

The pressure transmission medium may be a liquid, in particular an oil. A suitable liquid would be a silicon oil. The pressure transfer unit may be implemented as a diaphragm seal or as a remote seal.

In the embodiment of FIG. 1, the first sensor assembly 20 further comprises the absolute pressure sensors 51 and 52, and the differential pressure sensor 53 which are provided in the measuring unit 50. Each absolute pressure sensor 51, 52 comprises a sensor element that measures an absolute pressure or a line pressure that is applied by the process fluid at the respective port 11, 12 and that is transmitted to the respective sensor via the transmission conduits 24. Such absolute pressure sensors measure the pressure against a fixed reference, such as vacuum or atmospheric pressure and are capable of measuring pressure up to high absolute values. As an example, the absolute pressure sensors 51, 52 may be configured to have a detection range of up to at least 500 bar, preferably at least 800 bars.

The differential pressure sensor 53 comprises a differential pressure sensor element to which the pressures applied to both ports 11, 12 are transmitted. If both pressures are equal, the sensor element does not experience any pressure difference and accordingly gives out a value of zero differential pressure. On the other hand, if the pressure at one of the ports 11 or 12 exceeds the pressure at the other port, the respective pressure difference applies a force to the sensor element which generates a corresponding signal that is indicative of the applied pressure difference. As long as the pressure differences are within the applicable measurement range of the differential pressure sensor 53, the sensor can measure the differential pressure at high or at low absolute pressures. For large pressure differences which exceed the range of the differential pressure sensor 53, a pressure difference may be measured by making use of the absolute pressure sensors 51 and 52. A protection mechanism may be implemented in the sensor assembly 20 to prevent damage to the differential pressure sensor 53 in such cases.

In particular, the first sensor assembly 20 may comprise a pressure sensor that is configured as described in the document WO 2015/003856 A1. A common chamber can be provided per measuring port which is filled with the pressure transmission medium and from which the pressure is applied to the respective first or second absolute pressure sensor 51, 52, and to both sides of the differential pressure sensor 53.

In other embodiments, no pressure transfer units 21, 22, 31, 32 may be mounted to the respective measuring ports 11, 12, 13, 14, but the sensors 51, 52, 53 and 61, 62, 63 may comprise pressure transducers that are directly mounted in the respective measuring ports, and an electrical connection may be provided between such pressure transducers and the respective measuring unit 50, 60.

The subsea flow meter assembly 100 comprises a corresponding second sensor assembly 30 and a second measuring unit 60, which are configured similar to the first sensor assembly 20 and the first measuring unit 50, respectively. In particular, the second sensor assembly 30 comprises the pressure transfer units 31, 32 mounted in the first and second measuring ports 13, 14, the transmission conduits 34, which can be provided in the form of hydraulic pipes, and the absolute pressure sensors 61, 62 and the differential pressure sensor 63. The sensors 61, 62 and 63 are arranged within the (second) subsea enclosure 69 of the second measuring unit 60.

In the example of FIG. 1, the pipe section 101 comprises two additional measuring ports 15, 16 in which temperature probes 23, 34 are provided for measuring the temperature of the process fluid flowing in the pipe section. The temperature probe 23 is connected to the first measuring unit 50 which includes a temperature measuring unit 54 that takes temperature measurements by the connected probe 23. As an example, the probe 23 may be implemented as a thermocouple, of which the temperature measuring unit 54 takes voltage measurements and derives a respective temperature. The second temperature probe 33 is similarly connected to a corresponding second temperature measuring unit 64 provided in the second measuring unit 60.

In other embodiments, only one temperature probe may be provided, or one or two temperature probes may be arranged in one of the measuring ports 11, 12, 13, 14. In even further embodiments, the temperature may be measured at a different position, for example within the ambient medium or at the respective measuring unit 50, 60.

The first measuring unit 50 comprises an evaluation unit 55 that receives the measurements taken by the absolute and differential pressure sensors 51, 52 and 53 and the temperature from the temperature measuring unit 54. The evaluation unit 55 is configured to determine a flow rate on the basis of the received measurements. Evaluation unit 55 may comprise electronic circuits for this purpose, such as a microprocessor, memory and the like.

Within the subsea enclosure 59 of the first measuring unit 50, a chamber 58 is provided. Subsea enclosure 59 is preferably a pressure resistant subsea enclosure that maintains a pre-defined internal pressure within the chamber 58. Preferably, the pressure is below 5 bars, it may for example be about 1.5 bars or about 1 bar, in particular it may be close to atmospheric pressure. Components of the evaluation unit 55, such as the microprocessor and memory, are disposed in the chamber 58. Accordingly, a conventional processor can be used for determining the flow rate from the measurements. It is noted that the sensors or units 51, 52, 53 and 54 may deliver analog signals that are representative of the respective measurement taken, and evaluation unit 55 may be configured to convert these analog signals into respective measurement values by making use of a respective calibration or the like. In other embodiments, the sensors 51, 52, 53 and the temperature measuring unit 54 may directly deliver digital or analog values that are already calibrated. Evaluation unit 55 may comprise respective analog to digital converters, which may also be arranged within the chamber 58. Electric and electronic components of the sensors and units 51-54 may be provided in chamber 58 and may be provided integral with circuits of the evaluation unit 55.

Measuring unit 50 further comprises an output interface 56 at which it provides a signal indicative of the determined flow rate. The signal can be an analog signal or a digital signal. Preferably, the interface is a bus interface, for example of a CAN (controller area network) bus or of a Modbus or PROFIBUS or the like. Interface 56 may be provided by an electrical connection through the subsea enclosure 59, by a connector or the like. As indicated by a dashed line in FIG. 1, a connection can be provided to the interface 56, for example from a subsea control unit, or from a topside control unit installed on an offshore platform, or other vessel, or at an onshore site. In such configuration, it becomes possible to directly receive one signal that is representative of the flow rate of the medium flowing within the pipe section 101. This is an advantage over conventional systems in which measurements will be taken at different positions, and the measurement signals will have to be transmitted to a respective topside control unit at which the flow rate had to be determined.

The second measuring unit 60 is configured correspondingly, with a second evaluation unit 65 including corresponding electronic components, such as a microprocessor and memory, which are disposed in a chamber 68 within the subsea enclosure 69 that is kept at a predetermined pressure, such as atmospheric pressure. Evaluation unit 56 is configured to determine a flow rate of the flow of medium through the pipe section 101 on the basis of the measurements provided by the sensors 61, 62 and 63 at the temperature measuring unit 64. A signal indicative of the determined flow rate is given out via the interface 66. The above explanations apply equally to the sensor assembly 30 and to the measuring unit 60. As can be seen, a fully independent measurement of the flow rate can be obtained via the second sensor assembly 30 and the second measuring unit 60. One or two control units can thus be connected to the interfaces 56, 66 and can receive independent measurements of the flow rate in the pipe section 101 by only one respective cable connection. A very efficient and secure flow measurement may thus become possible. Furthermore, the reliability can be increased, since a malfunction of one of the flow measurements may be determined by a comparison, and upon failure of one of the flow measurements, the flow rate can still be measured by the respective other measuring unit.

The first and second measuring units 50, 60 are mounted to the pipe section 101 by the respective mounts 57, 67. The subsea flow meter assembly 100 can thus be provided as a single module or unit that can be mounted easily by attaching the pipe section 101 with respective flanges. As mentioned above, only two cable connections are required to obtain two independent measurements of the flow rate through the pipe section 101. Since the measuring ports are provided in close proximity of each other, and the differential and absolute pressure measurements are essentially taken from the same ports, the accuracy of the flow rate determination can furthermore be improved. Since it is sufficient to provide one through connection or one connector on each measuring unit, costs are reduced and the risk of failure of such through connection or connector may furthermore be reduced.

Figure 2:
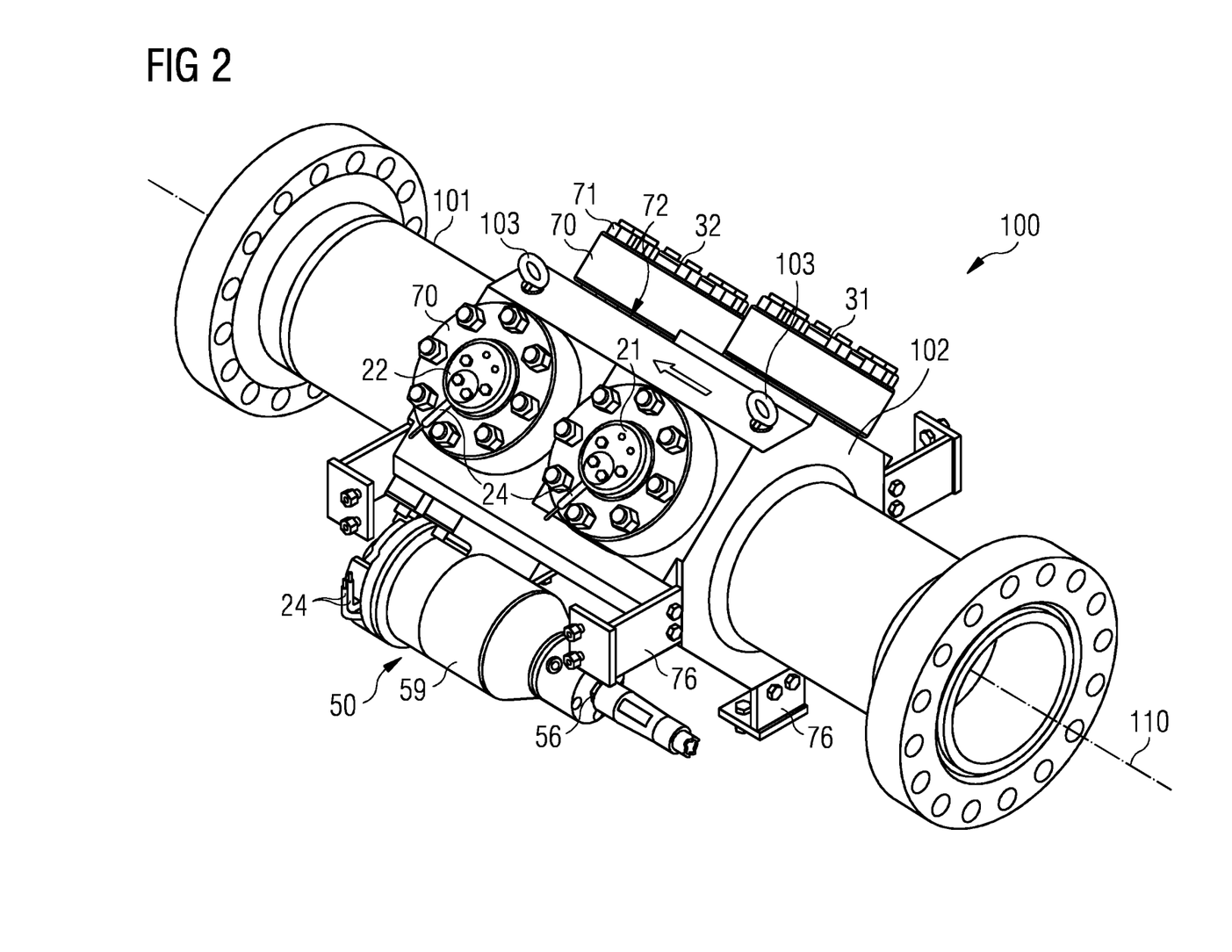
FIG. 2 is a schematic drawing showing a perspective view of a subsea flow meter assembly according to a further embodiment of the invention.

FIG. 2 illustrates a particular implementation of the subsea flow meter assembly 100 of FIG. 1. Accordingly, the explanations given above are equally applicable to the embodiment of FIG. 2. In particular, the internal components of the subsea flow meter assembly 100 are not illustrated in FIG. 2, but they may be configured similar to FIG. 1. In the embodiment of FIG. 2, the components are to scale with each other. It should be clear that they may be sized differently in other embodiments.

In the example of FIG. 2, the pipe section 101 has flanges provided at both ends thereof, and it has an intermediate portion at which the ports 11, 12, 13, 14 are provided and at which the measuring units 50, 60 are mounted. The measuring units 50, 60 may also be termed 'flow computer'. In the configuration of FIG. 2, the pipe section 101 has a mounting portion 102 which is a section of increased diameter of the pipe section 101. The mounting portion 102 has a substantially rectangular cross section (with beveled edges), and has four sides. At one of the beveled edges, lifting eyes 103 are provided for installation of the pipe section 101. The two ports 11, 12 are provided on one of the sides and the two ports 13 and 14 are provided on another side. The mounts 57 and 67 (not visible in FIG. 2) and the respective measuring units 50 and 60 are mounted to the two other remaining sides of the mounting portion 102.

Flanges 70 are used for mounting the pressure transfer units 21, 22 in the respective ports 11, 12. Correspondingly, the pressure transfer units 31 and 32 are mounted with flanges 70 to their respective measuring ports 13, 14. The flanges 70 are fastened to the mounting portion 102 via bolts 71, and a seal or gasket 72 is provided for sealing purposes. Only the ends of the connections 24 in form of transmission conduits from the pressure transfer units 21, 22 to the measuring unit 50 are shown for the purpose of a clear presentation.

As can be seen, the subsea enclosure 59 of the measuring unit 50 has a cylindrical shape with an axial direction that is parallel to the axial direction 110. The second measuring unit 60 can be configured correspondingly. Accordingly, a compact configuration of the subsea flow meter assembly 100 can be achieved. The interface 56 is implemented in form of an electrical through connection in the embodiment of FIG. 2, but may also be implemented differently, for example as a connector. Besides an electrical data transmission line, it may also comprise an optical data transmission line, or it may employ power line communication.

Figure 3:
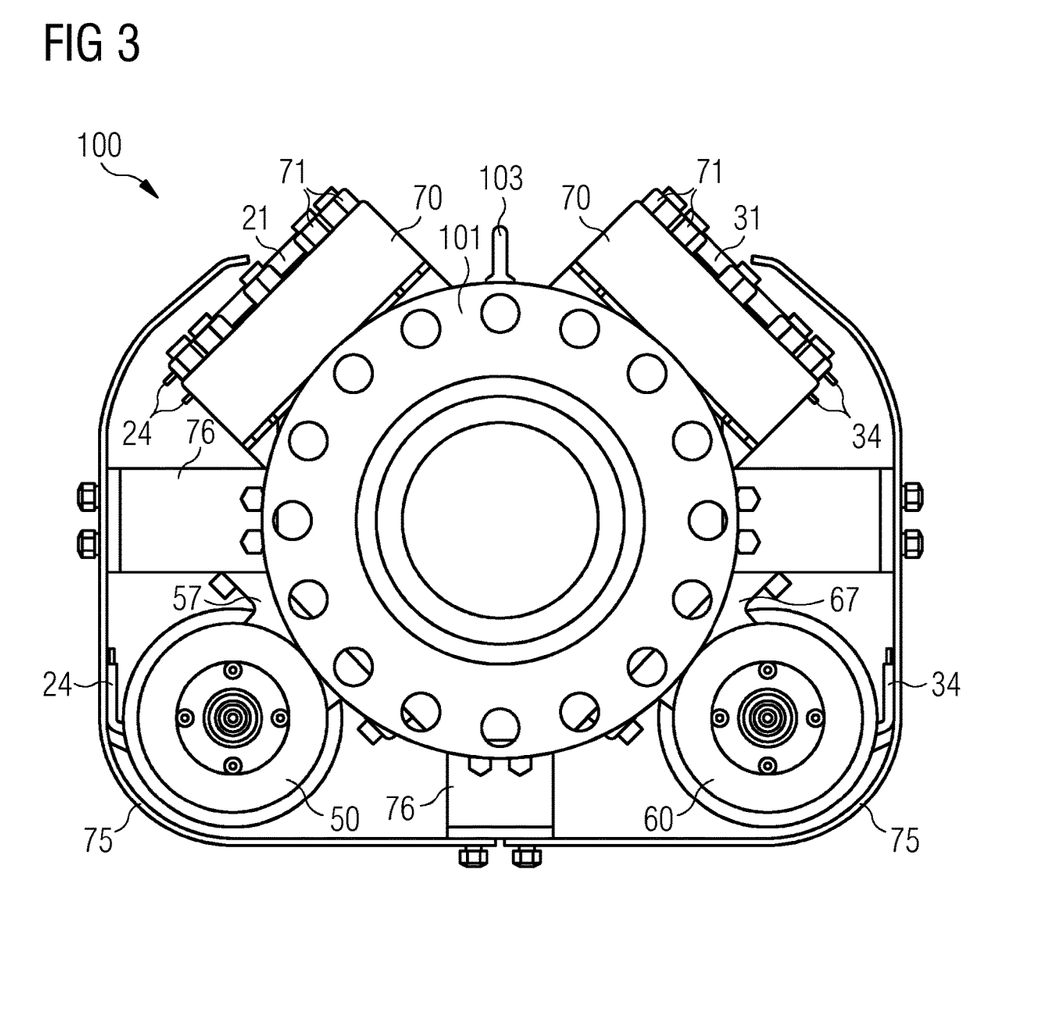
FIG. 3 is a schematic drawing showing a front view of the subsea flow meter assembly of FIG. 2.

FIG. 2 further illustrates mounts 76 for mounting a protective shield 75 to the pipe section 101, which is illustrated in FIG. 3.

The arrow shown on the mounting portion 102 illustrates the direction of flow of the medium in operation of the subsea flow meter assembly 100.

In the front view of FIG. 3, the protective shield 75 is illustrated. As can be seen, the protective shield 75 is composed of two halves which are mounted using the mounts 76. The protective shield 75 is arranged so that at least the measuring units 50, 60 are protected against mechanical damage. Furthermore, the protective shield 75 extends up to a position at which also the transmission conduits 24, 34 are protected from mechanical damage. Again, only the ends of the transmission conduits 24, 34 are shown.

The diameter of the measuring units 50, 60 is kept relatively small; it is in particular smaller than the outer diameter of the pipe section 101. Together with their alignment, a very compact subsea flow meter assembly can be achieved. Furthermore, FIG. 3 illustrates that the pressure transfer units 21, 31 do not substantially protrude from their respective flanges 70 with which they are mounted to the pipe section 101. They protrude less than the thickness of the respective attachment flange 70. In particular, they do not protrude further than the bolts 71 that are used for attaching the attachment flanges 70 to the pipe section 101. By such configuration, the risk of damage to such pressure transfer units or to directly mounted pressure transducers can be reduced, while at the same time further reducing the size of the subsea flow meter assembly.

Figure 4:
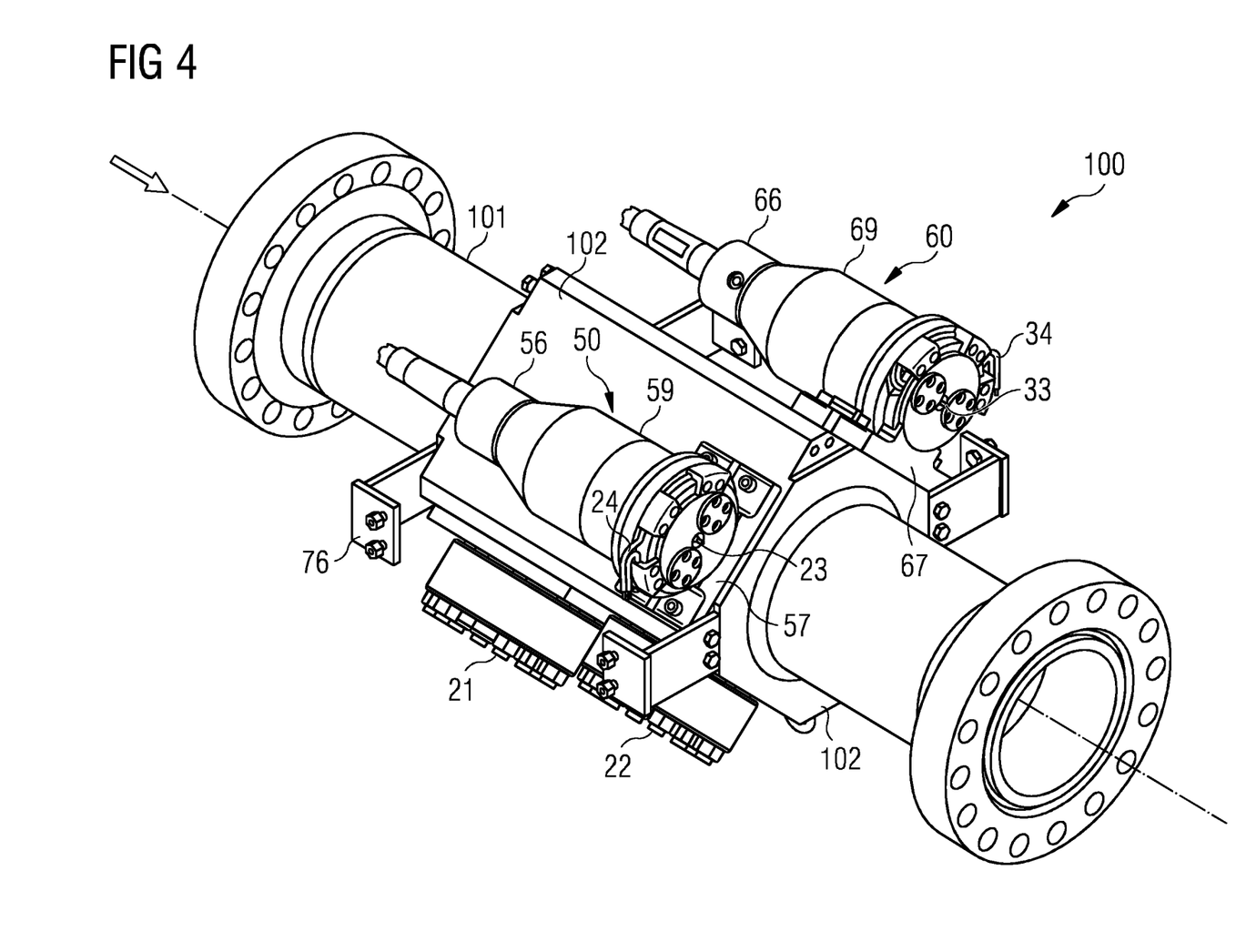
FIG. 4 is a schematic drawing showing a perspective view of the subsea flow meter assembly of FIG. 2, turned about 180 degrees around an axis perpendicular to the axial direction.

FIG. 4 shows a perspective view of the subsea flow meter assembly 100 of FIG. 2, yet rotated about an axis that is perpendicular to the axial direction 110 such that the lower side of the subsea flow meter assembly 100 is now facing upwards. Accordingly, the arrow indicating the direction of flow through the pipe section 101 now points in the opposite direction.

FIG. 4 illustrates an example how the first and second measuring units 50, 60 can be mounted to the pipe section 101 via the mounts 57, 67, respectively. FIG. 4 furthermore illustrates temperature probes 23 and 33 which are provided at their respective measuring units 50, 60. Accordingly, whereas in the embodiment of FIG. 1, the temperature of the medium flowing through the pipe section or the process medium is measured, the embodiment of FIGS. 2 to 4 measures the temperature of the ambient medium that surrounds the subsea flow meter assembly 100 when installed subsea. In this way, the number of required connections may furthermore be reduced, and such measurement is particularly beneficial in situations where the process medium has substantially the same temperature as the ambient medium, for example when pumping seawater or the like.

Similar to FIG. 2, the protective shield is not illustrated in the drawing of FIG. 4 to allow better visibility of the other components of the subsea flow meter assembly 100.

In the configuration of FIGS. 2 to 4, the measuring ports 11, 12 or 13, 14 and the measuring units 50, 60 are provided in the same axial region, and are distributed circumferentially around the pipe section 101. In particular, they do not protrude in an axial direction from the mounting portion 102. The configuration can thus be kept compact also in an axial direction.

As can be seen from the above, a compact and a robust subsea flow meter assembly is provided, having an increased reliability and only requiring two connections for providing two independent measurements of flow rate of a medium, in particular a process fluid. By providing both line pressure measurements and differential pressure measurements at substantially the same location, and furthermore providing temperature measurements at substantially the same location, the flow rate may be measured with increased accuracy. Furthermore, due to the parallel use of absolute differential pressure measurements, the measuring range for the differential pressure and thus for flow rates may be extended. Since there may be only one electrical connection and two hydraulic connections per measuring unit, the reliability and lifetime of the subsea flow meter assembly may be improved. Furthermore, a high availability of the subsea flow meter assembly is achieved by providing the two independent flow rate measurements.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A subsea flow meter assembly for measuring a flow of a medium at a subsea location, comprising:
   a pipe section, extending in an axial direction and providing a flow path for the medium;
   at least four measuring ports, each provided at a different location in the pipe section, the at least four measuring ports including a first measuring port and a second measuring port, spaced apart in the axial direction, and a third measuring port and a fourth measuring port, spaced apart in the axial direction;
   a first sensor assembly, configured to measure at least a differential pressure between the first measuring port and the second measuring port and an absolute pressure at the first measuring port and the second measuring port, the first sensor assembly including at least a first differential pressure sensor connected to both the first measuring port and the second measuring port and two absolute pressure sensors respectively connected to the first measuring port and the second measuring port;
   a second sensor assembly, configured to measure at least a differential pressure between the third measuring port and the fourth measuring port and an absolute pressure at the third measuring port and the fourth measuring port, the second sensor assembly including at least a second differential pressure sensor connected to both the third measuring port and the fourth measuring port and two absolute pressure sensors respectively connected to the third measuring port and the fourth measuring port;
   a first measuring unit, mounted to the pipe section and configured to take measurements of the differential pressure and the absolute pressure via the first sensor assembly, the first measuring unit including a first subsea enclosure mounted to the pipe section; and
   a second measuring unit, mounted to the pipe section and configured to take measurements of the differential pressure and the absolute pressure via the second sensor assembly, the second measuring unit including a second subsea enclosure mounted to the pipe section,
   wherein the first measuring unit and the second measuring unit further each include an evaluation unit and an output interface, wherein each respective evaluation unit is disposed in each respective subsea enclosure and is configured to receive measurements taken by the respective absolute and differential pressure sensors and is configured to determine a flow rate of a flow of medium through the pipe section based on the pressure measurements and is configured to give out a signal at the output interface, representative of the determined flow rate.

2. The subsea flow meter assembly of claim 1, further comprising:
at least one temperature probe, connected to at least one of the first measuring unit and the second measuring units, to measure at least one of the temperature of the medium in the pipe section or the temperature of an ambient medium in which the subsea flow meter assembly is disposed.

3. The subsea flow meter assembly of claim 2, wherein the temperature probe is arranged in one of the four measuring ports or in an additional measuring port.

4. The subsea flow meter assembly of claim 1, wherein each of the at least four measuring ports is closed by a pressure transfer unit or a sensor of the respective first sensor assembly or second sensor assembly, wherein the pressure transfer unit or the sensor is configured to seal the respective measuring port so that medium flowing in the pipe section is prevented from leaving the pipe section through the measuring port.

5. The subsea flow meter assembly of claim 1, wherein in each of the at least four measuring ports, a pressure transfer unit of the respective sensor assembly is arranged, wherein each pressure transfer unit comprises a separation diaphragm to separate the medium flowing inside the pipe section from a pressure transmission medium, and further comprises a transmission conduit, connected to the respective measuring unit, to transmit the pressure from the respective one of the at least four measuring ports to the respective measuring unit via the pressure transmission medium.

6. The subsea flow meter assembly of claim 1, wherein the subsea enclosure of each of the first measuring unit and the second measuring units is pressure resistant, wherein each subsea enclosure includes a chamber having an internal pressure and wherein the respective evaluation unit comprises electronic circuits disposed inside the chamber.

7. The subsea flow meter assembly of claim 6, wherein the subsea enclosure has a cylindrical shape, and wherein each measuring unit is mounted such that the cylindrical shape extends in the axial direction.

8. The subsea flow meter assembly of claim 6, wherein a diameter of the subsea enclosure is relatively smaller than an outer diameter of the pipe section.

9. The subsea flow meter assembly of claim 1, further comprising an electrical power connection and data connection from each of the first and second measuring units to a control unit.

10. The subsea flow meter assembly of claim 1, further comprising a protective shield, mounted such that each of the first measuring unit and the second measuring units is located between the pipe section and the protective shield.

11. The subsea flow meter assembly of claim 1, wherein the first measuring port and the third measuring port are located at a same axial position and wherein the second measuring port and the fourth measuring port are located at a same axial position in the axial direction.

12. The subsea flow meter assembly of claim 1, wherein the first measuring port and the second measuring port are located at a same first circumferential position, and wherein the third measuring port and the fourth measuring port are located at a same second circumferential position, and wherein the first circumferential position and the second circumferential position and the first measuring unit and the second measuring unit are distributed around a circumference of the pipe section.

13. The subsea flow meter assembly of claim 1, wherein each of the first measuring port, the second measuring port, the third measuring port and the fourth measuring port is surrounded by an attachment flange for attachment of a pressure transfer unit or a sensor of the respective sensor assembly, wherein each respective attachment flange includes a thickness in a mounting direction of the attachment flange, wherein the respective pressure transfer unit or sensor protrudes a distance less than the thickness from the attachment flange when mounted to the respective measuring port.

14. The subsea flow meter assembly of claim 1, wherein the flow meter is a Venturi flow meter, the pipe section including a constriction, wherein the first measuring port and the third measuring port are located upstream of the constriction and wherein the second measuring port and the fourth measuring port are located at the constriction or downstream of the constriction.

15. The subsea flow meter assembly of claim 1, wherein the first sensor assembly and the first measuring unit form a first flow meter, and wherein the second sensor assembly and the second measuring unit form a second flow meter, and wherein the first flow meter and the second flow meter have a substantially similar configuration, or substantially the same configuration.

16. A method of providing a subsea flow meter assembly for measuring a flow of medium at a subsea location, comprising: providing a pipe section extending in an axial direction, the pipe section providing a flow path for the medium;
providing at least four measuring ports at different locations in the pipe section, wherein a first measuring port and a second measuring port of the at least four measuring ports are spaced apart in axial direction of the pipe section, and wherein a third measuring port and a fourth measuring port of the at least four measuring ports are spaced apart in an axial direction of the pipe section;
connecting a first sensor assembly to the first measuring port and the second measuring port to measure at least a differential pressure between the first measuring port and the second measuring port and an absolute pressure at the first measuring port and the second measuring port, wherein the first sensor assembly comprises at least a first differential pressure sensor connected to both the first measuring port and the second measuring port and two absolute pressure sensors, each respectively connected to the first measuring port and the second measuring port;
connecting a second sensor assembly to the third measuring port and the fourth measuring port to measure at least a differential pressure between the third measuring port and the fourth measuring port and an absolute pressure at the third measuring port and the fourth measuring port, wherein the second sensor assembly comprises at least a second differential pressure sensor connected to both the third measuring port and the fourth measuring port and two absolute pressure sensors respectively connected to the third measuring port and the fourth measuring port;
mounting a first measuring unit to the pipe section, wherein the first measuring unit is configured to take measurements of the differential pressure and the absolute pressure via the first sensor assembly, wherein the first measuring unit includes a first subsea enclosure mounted to the pipe section; and
mounting a second measuring unit to the pipe section, wherein the second measuring unit is configured to take measurements of the differential pressure and the absolute pressure via the second sensor assembly, wherein the second measuring unit includes a second subsea enclosure mounted to the pipe section;

wherein the first measuring unit and the second measuring unit further each comprise an evaluation unit and an output interface, wherein the respective evaluation unit is disposed in the respective subsea enclosure and is configured to determine a flow rate of a flow of medium through the pipe section based on the pressure measurements and to give out a signal, at the output interface, representative of the determined flow rate.

17. The subsea flow meter assembly of claim 2, wherein each of the at least four measuring ports is closed by a pressure transfer unit or a sensor of the respective first sensor assembly or the second sensor assembly, wherein the pressure transfer unit or the sensor is configured to seal the respective measuring port so that medium flowing in the pipe section is prevented from leaving the pipe section through the measuring port.

18. The subsea flow meter assembly of claim 6, wherein each subsea enclosure includes a chamber having an internal pressure below 5 bar.

19. The subsea flow meter assembly of claim 7, wherein a diameter of the subsea enclosure is relatively smaller than an outer diameter of the pipe section.

20. The subsea flow meter assembly of claim 13, thickness in a mounting direction of the attachment flange, wherein the respective pressure transfer unit or sensor protrudes a distance less than 50% of the thickness from the attachment flange when mounted to the respective measuring port.

21. The subsea flow meter assembly of claim 13, thickness in a mounting direction of the attachment flange, wherein the respective pressure transfer unit or sensor protrudes a distance less than 25% of the thickness from the attachment flange when mounted to the respective measuring port.

* * * * *